United States Patent [19]

Münchbach

[11] 3,748,938

[45] July 31, 1973

[54] FLYING SHEARS FOR CUTTING RAPIDLY RUNNING SHEET METAL BANDS

[75] Inventor: Curt Münchbach, Pforzheim-Sonnenberg, Germany

[73] Assignee: Irma Ungerer, Pforzheim, Germany

[22] Filed: Sept. 2, 1970

[21] Appl. No.: 68,899

[30] Foreign Application Priority Data

Sept. 2, 1969   Germany............. P 19 44 427.4

[52] U.S. Cl......................... 83/305, 83/328, 83/628, 83/632
[51] Int. Cl................................. B23d 25/08
[58] Field of Search....................... 83/284, 315, 316, 83/304, 305, 321, 327, 328, 601, 602, 604, 608, 626, 628, 632, 630

[56] References Cited
UNITED STATES PATENTS

| | | | |
|---|---|---|---|
| 3,058,379 | 10/1962 | Gustavsson | 83/315 X |
| 2,800,179 | 7/1957 | Münchbach | 83/316 |
| 3,277,759 | 10/1966 | Brombach | 83/316 X |
| 3,548,698 | 12/1970 | Munchbach | 83/316 X |

Primary Examiner—J. M. Meister
Attorney—Edwin E. Greigg

[57] ABSTRACT

A toggle joint for driving a cutter blade of a flying shears. The blade is connected via a link to the junction of the toggle joint rods. One or both of the opposite ends of the rods perform a cyclic movement, e.g., a rotation.

4 Claims, 5 Drawing Figures

PATENTED JUL 31 1973 3,748,938
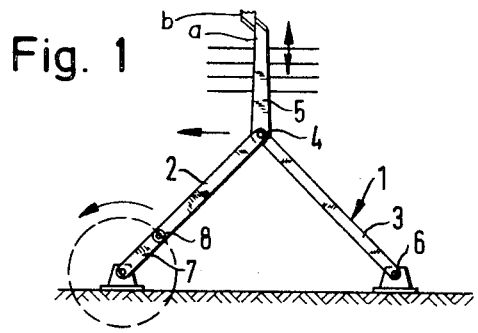
Fig. 1
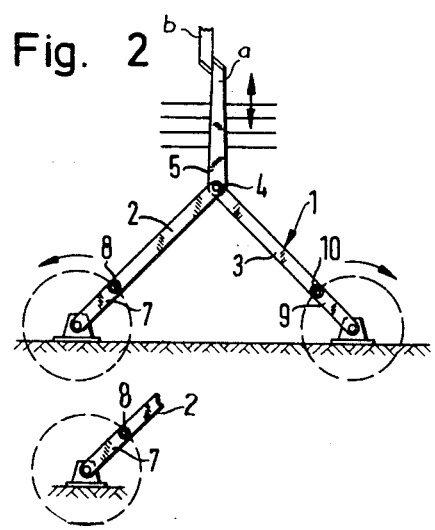
Fig. 2
Fig. 2a
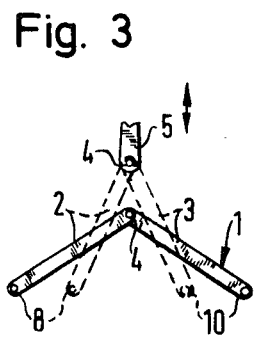
Fig. 3
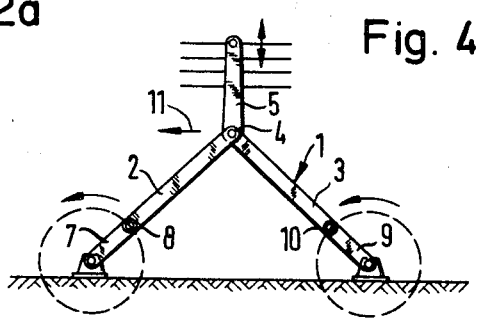
Fig. 4
Inventor
Curt Münchbach
by Edwin E. Greigg

FLYING SHEARS FOR CUTTING RAPIDLY RUNNING SHEET METAL BANDS

FIELD OF THE INVENTION

The invention relates to flying shears for cutting up rapidly running sheet metal bands into equal sections of adjustable length.

BACKGROUND OF THE INVENTION

Shears having a toggle joint for imparting cutting motion to one of the blades are particularly suitable for cutting rapidly running sheet metal bands into sections to be used in the manufacture of automobile bodies. The bands should be able to run without interruption when the cut is being performed, so that it is necessary to make the shears run with the band during the cutting process. Shears of this type have a lower and an upper cutting blade, and usually only the lower cutting blade is driven during the cutting process.

In prior constructions, the cutting movement is usually obtained by means of a crank shaft or an eccentric via push rods or levers or additional gearings, which in their turn operate on the shaft. These prior constructions have in common that the cutting process coincides with a portion of the stroke of the driving mechanism, during which the stroke velocity and consequently also the cutting velocity is relatively small. The decrease in stroke velocity of the lower cutter blade during the cutting process is due to the fact that the driving mechanism is then immediately before the upper dead center position.

In these prior flying shears, the movement of the cutting blades, which has to take place in synchronism with the continuously running band, is mostly a curve of approximately ellipse-like form. The movement obtained in the manner referred to above has a more or less pronounced sinusoidal character, i.e., practically satisfactory synchronism of the shears with the band is present over only a fraction of the angle of rotation of the driving crank-shaft. Since, with these simple drive mechanisms, synchronism between cutter and band movement relative to the direction of the latter can be realized with sufficient accuracy only for short time intervals, this makes it difficult to complete the entire cutting process, including the opening of the cutter blades, within the short interval, especially when the cutting velocity is comparatively small. This is particularly true if the band to be cut is comparatively thick. If there is used for the cutting process an interval of time during which the velocity of transport of the cutter is noticeably different from that of the band, this leads to buckling of the band which should be avoided as far as possible. In this connection also, damage to the edges may occur, such as excessive formation of burrs. In order to avoid these difficulties, the cutter blades have been adjusted with some inclination relative to the direction of transportation, however this remedy is of very limited usefulness when the cutting velocity is low.

The object of the invention is therefore to increase the cutting velocity in flying shears making use of driving mechanisms of simple construction so as not to disturb the other movement of the flying shears, with which the invention is not concerned, namely the reciprocating movement in the direction of transportation of the band. A further object is to avoid the necessity to depart from conventional driving mechanisms for the reciprocating movement.

SUMMARY OF THE INVENTION

The essential feature of the invention consists in that the driving force for the movable cutter blade is derived from the joint of a toggle joint unit which is driven from an eccentric or a crank shaft at the remote end of one of the rods of the toggle joint. Owing to the substantially horizontal disposition of the toggle joint, it is possible to increase the stroke velocity of the cutting blade at the precise moment of the cutting process to such an extent that an extremely rapid cut is produced and a similarly rapid lowering of the blade. The increased cutting speed, which owing to the derivation of the driving movement from junction or knee joint of the toggle joint is about twice the speed that would be obtained with a vertically disposed toggle joint, makes it possible to cut through sheet metal of a certain thickness in substantially shorter time, so that within the interval of synchronism much thicker bands can be cut off than would be possible with conventional driving arrangements for the cutter. Also, with the shortened cutting period, it is possible to arrange the cutter with its blades in inclined position, which leads to reduced cutting forces and reduced pressure, so that the elements which have to take up these forces can be of correspondingly lighter construction.

A further reduction of the cutting time by about one half is possible by doubling the frequency of the lower cutter blade relative to that of the upper cutter blade and skipping every second stroke. This skipping of every second stroke can be obtained by intermittent turning of a further eccentric or crank shaft drive coupled to the second rod of the toggle joint at the same time as the first eccentric or crank shaft drive is allowed to run continuously. Therefore, in this further embodiment of the invention, both rods of the toggle joint are driven by eccentric or crank shaft drive. The intermittent turning of the second eccentric or crank shaft is preferably obtained by means of a pneumatic or hydraulic auxiliary drive. This auxiliary drive may be controlled by a mechanical or electrical control device and makes it possible to deactivate one or more cutting strokes so as to to cause longer sections of the band to be cut.

A further possibility of suppressing a stroke of the lower blade, according to an embodiment of the invention is the use of an eccentric or crank shaft drive which is lowerable in the direction of the cutting movement.

Further embodiments of the invention as well as advantages and details thereof will be described with reference to the drawing.

THE DRAWING

FIG. 1 is a schematic side elevational view of a first embodiment of the flying shears driving mechanism according to the invention;

FIG. 2 is a schematic side elevational view of a second embodiment of the flying shears driving mechanism according to the invention;

FIG. 2a is a schematic partial side elevational view of the embodiment of FIG. 2 illustrating the arm 2 and crank drive 7 in their lowered position;

FIG. 3 is a schematic side elevational view of some components of the structure shown in FIG. 2 in their two extreme positions during operation and FIG. 4 illustrates a structure identical to FIG. 2 showing some components driven in directions different from those depicted in FIG. 2.

DESCRIPTION OF EMBODIMENTS

As is shown in FIGS. 1–4, the lower cutter blade a of the flying shears (which also includes an upper cutter blade b) is driven by means of a horizontally disposed toggle joint 1, in which the movement of the junction or knee joint 4 between the rods 2 and 3 is transferred by a push rod 5 to the lower blade a.

In the embodiment of FIG. 1, the toggle rod 3 is held fixed at 1 and 6 while the rod 2 is attached to a crank drive 7 at a joint 8 and is driven by rotation of crank drive 7 as shown. The path of joint 4 is along the arc of a circle with its center at point 6 and the radius equals the length of rod 3.

In the embodiment of FIG. 2, both of the toggle rods 2 and 3 are driven by crank drives 7 and 9 rotating in opposite directions. Owing to the opposed directions of the crank drives 7 and 9, the path described by knee joint 4 is on a vertical line, if the crank drive arms are of equal length and the toggle rods also are of equal length and, the drive of the toggle rods is symmetrical. In this case toggle rod 3 is joined to crank drive 9 by a pivot joint 10. FIG. 3 shows the two extreme positions of toggle joint 1.

In FIG. 2a, there is also shown a further extreme position of crank drive 7, in which it is in a lowered position illustrated in broken lines. Such lowering of crank drive 7 leads to a suppression of the cut, even if crank drive 9 runs continuously, since the stroke of the lowered blade a corresponding to the lowered broken-line position of crank drive 7 is not sufficient to make it cooperate with the upper blade b. Thus, as long as the crank drive 7 is in its lowered position, the advancing sheet material passes uncut between the blades a and b. After a predetermined number of "no cuts", the crank drive 7 may be periodically lifted into its normal position shown in FIG. 2 for allowing blades a and b to cooperate once to effect one cut. Thereupon, the crank drive 7 is again lowered for allowing the occurrence of a predetermined number of "no cuts." This makes it possible in a simple manner to vary the frequency of the cuts made in the band and thereby change by multiple magnitudes the length of the cut off sections.

The movement of knee joint 4 along a vertical line takes place only if toggle rods 2 and 3 are driven symmetrically relative to each other. If for instance crank drive 7 is always displaced by a certain angle relative to crank drive 9, movement of toggle joint 4 will occur along a path which is curvilinear. For instance, if crank drive 7 is displaced 90° relative to crank drive 9, knee joint 4 does not achieve the stroke according to symmetrical drive and a large portion of its movement will be horizontal. Such a displacement of one arm relative to the other makes it possible to reduce the stroke to such an extent that no cut is performed by the lower blade. A periodic suppression of one or more cuts is obtained, for instance, if one of the crank drives has a speed of rotation which is an integral multiple of that of the other drive.

In the embodiment of FIG. 4, which corresponds to FIG. 2 with the exception of the direction of rotation of the crank drives, the two drives 7 and 9 rotate in same direction. If the drive is symmetrical and the toggle joint is also symmetrical as shown in FIG. 4, joint 4 will describe a curvilinear path of approximately ellipse form having its major axis perpendicular. This kind of drive, when symmetrical relative to the crank arms, makes the movement of the toggle joint have a horizontal component as shown by arrow 11. The form and position of the curvilinear path, in the case of a symmetrical driving mechanism, is dependent on the length of the crank arms. With this type of drive also, it is possible by adjustment of the cranks relative to each other or by driving them with different speeds to achieve suppression of certain cuts and thereby control the length of the cut-off sections.

That which is claimed is:

1. A flying shears for transversely cutting rapidly running bands of metal sheet into sections of equal length, comprising a cutter having an upper and a lower cutting blade, toggle joint means having a pair of rods pivotally connected at one of their ends forming a knee joint, a link connecting one of said blades to said knee joint, and eccentric drive means connected to the other ends of both rods for imparting cyclic movements thereto.

2. A shears as claimed in claim 1, in which said eccentric drive means is adapted to impart cyclic movements in the same sense to both of said other ends.

3. A flying shears for transversely cutting rapidly running bands of metal sheet into sections of equal length, comprising a cutter having an upper and a lower cutting blade, toggle joint means having a pair of rods pivotally connected at one of their ends forming a knee joint, a link connecting one of said blades to said knee joint, drive means for imparting a cyclic movement to the other end of at least one of said toggle rods and adjustable means for displacing one of said other ends in the direction of the cutting movement of said one blade.

4. Shears for transversely cutting rapidly running bands of metal sheet into sections of equal length, comprising a cutter having an upper and a lower cutting blade, toggle joint means having a pair of rods pivotally connected at one of their ends forming a knee joint, a link connecting one of said blades to said knee joint, and eccentric drive means connected to the other ends of both rods for imparting cyclic movements thereto in opposite sense to one another.

* * * * *